(12) United States Patent
Tredoux

(10) Patent No.: US 10,484,453 B2
(45) Date of Patent: Nov. 19, 2019

(54) SYSTEM AND METHOD FOR PRINTING DOCUMENTS USING PRINT HARDWARE AND AUTOMATIC CONTEXT INFERENCE

(71) Applicant: Xerox Corporation, Norwalk, CT (US)

(72) Inventor: Gavan Leonard Tredoux, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 148 days.

(21) Appl. No.: 14/811,935

(22) Filed: Jul. 29, 2015

(65) Prior Publication Data

US 2017/0034247 A1   Feb. 2, 2017

(51) Int. Cl.
   *H04L 29/08*    (2006.01)
   *H04W 4/029*    (2018.01)
   *H04W 4/80*     (2018.01)

(52) U.S. Cl.
   CPC .............. *H04L 67/06* (2013.01); *H04L 67/12* (2013.01); *H04L 67/125* (2013.01); *H04L 67/18* (2013.01); *H04L 67/22* (2013.01); *H04L 67/30* (2013.01); *H04W 4/029* (2018.02); *H04W 4/80* (2018.02)

(58) Field of Classification Search
   CPC .... G06F 3/1288; G06F 3/1204; G06F 3/1205; G06F 3/1207; G06F 3/1236
   See application file for complete search history.

(56) References Cited

U.S. PATENT DOCUMENTS

| 2003/0069921 A1* | 4/2003 | Lamming ......... G06F 17/30905 709/203 |
| 2004/0172586 A1* | 9/2004 | Ragnet ............. G06F 17/30011 715/255 |
| 2007/0229896 A1* | 10/2007 | Fujimori ............... G06F 3/1205 358/1.16 |
| 2010/0214614 A1* | 8/2010 | Ferlitsch ................ G06K 15/02 358/1.18 |
| 2015/0199157 A1* | 7/2015 | Xiao ..................... G06F 3/1236 358/1.15 |
| 2015/0244878 A1* | 8/2015 | Macauley ............. G06F 3/1204 358/1.2 |

* cited by examiner

*Primary Examiner* — Scott B Christensen
(74) *Attorney, Agent, or Firm* — Fox Rothschild LLP

(57) ABSTRACT

A method of printing a document from a mobile device comprises coupling the mobile device to a proximate print device. The method further comprises, by a processor of the mobile device executing a print software application that causes the processor to identify a document to be printed, use data obtained from the mobile device to identify a context at a time that is concurrent with identifying the document, use the context to customize the identified document by identifying and modifying at least one parameter of the identified document, and transmit the customized document to be printed to the print device for printing by the print device. The data obtained from the mobile device comprises one or more of the following data sensed by one or more sensors of the mobile device, or data gathered by one or more mobile applications of the mobile device.

30 Claims, 3 Drawing Sheets

SYSTEM AND METHOD FOR PRINTING DOCUMENTS USING PRINT HARDWARE AND AUTOMATIC CONTEXT INFERENCE

BACKGROUND

Mobile devices such as smartphones, notebook and laptop computers, PDAs (personal digital assistants), tablet computing devices, and so forth, are extremely prolific, and are extensively used to provide convenient storage and/or printing of various documents and data. Such devices are able to store the documents and data of the user, and allow the user to access such information in many different locations. When users with such mobile devices wish to print documents, files or other information stored on the mobile devices, information is transmitted via a print aware mobile application to a print device directly or through an intermediate processing device using mechanisms such as print.

The print documents, files, or other information to be printed may be dynamic and may include variable and/or fixed data. The user and/or the system may replace and/or enter the variable data at the time of printing with particular values and choices. For example, business cards include both fixed and variable data, personalized to the user, and are printed on-demand, on an ad-hoc basis.

In addition to replacing and/or entering the variable data, often times a user may also need to customize the style and/or content (fixed data and/or variable data) in order to make the print document context specific based on location, intended use, or other such parameters. For example, a user printing business cards for distribution in China may need to print the business cards such that they include localized context such as phone numbers printed using the local conventions and local language. A user may of course manually choose a document that is already localized to the context, but this requires more work, is confusing (especially if the user is unfamiliar with the printer functions), and may be inconvenient. The manual process is also cumbersome if performed on a small display mobile device such as smartphones, and is error prone.

The current disclosure discloses a system and method to determine the context in which a print job is generated for producing context specific variable print documents from mobile devices, using features of mobile devices that are widely deployed and available.

SUMMARY

A system and method of printing a document from a mobile device may include coupling the mobile device to a proximate print device and launching a print software application on the mobile device. the method may further include, by a processor of the mobile device, executing the print software application that causes the processor to identify a document to be printed, use data obtained from the mobile device to identify a context at a time that is concurrent with identifying the document, use the context to customize the identified document by identifying and modifying at least one parameter of the identified document, and transmit the customized document to be printed to the print device for printing by the print device. The data obtained from the mobile device comprises one or more of the following data sensed by one or more sensors of the mobile device, or data gathered by one or more mobile applications of the mobile device. In some embodiments, the print application may be automatically launched in response to the coupling of the mobile device to the print device. in at least one embodiment, a user may be prompted to confirm the identified context and the at least one parameter.

In an embodiment, coupling the mobile device to the print device may include establishing a near field communications link upon detection that the mobile device and the print device are within a communication range of each other.

In yet another embodiment, the at least one parameter associated with the identified context may include at least one of: language, style, color, font size, font type, color, layout, design, or images. In some embodiments, modifying the at least one parameter may include performing at least one of the following with respect to the at least one parameter removal, addition, or substitution.

In an embodiment, identifying the context may include performing at least one of the following: identifying context information relating to a geographical location of the mobile device, identifying context information relating to an intended use of the document, identifying context information relating to a user-profile associated with a user of the mobile device, identifying context information relating to a type of the document, or identifying context information relating to a time of coupling printing. In an embodiment, identifying context information relating to an intended use of the document may include at least one of the following: using one or more document processing applications of the mobile device to determine a format of the document, using one or more document processing applications of the mobile device to determine contents of the document, using location tracking sensors or applications of the mobile device to determine a location of printing, using one or more document processing applications of the mobile device to determine a source of the document, using one or more document processing applications of the mobile device to determine a source of the document, using a clock application of the mobile device to determine a time of printing, or parsing entries in a calendar application of the mobile device. In at least one embodiment, identifying the context may further include identifying types of context information using previous user selection or preferences.

Additionally and/or optionally, identifying context information relating to a geographical location of the mobile device may include at least one of the following: using one or more location tracking sensors of the mobile device to sense the location of the mobile device, or receiving data from a calendar application of the mobile device and using the data to identify the location of the mobile device. In certain embodiments, using the one or more location tracking sensors to sense the location of the mobile device comprises at least one of the following: using data captured by a positional sensor of the mobile device to detect the location of the mobile electronic device, using an identifier of a network to which the mobile device is connected, or using a micro-location technique of the mobile device.

In another aspect of the disclosure, a non-transitory computer-readable medium may include a plurality of instructions when executed by a processor cause the processor to identify a document to be printed on a mobile device, use data obtained from the mobile device to identify a context at a time that is concurrent with identifying the document, use the context to customize the identified document by identifying and modifying at least one parameter of the identified document, and transmit the customized document to be printed to a print device for printing by the print device. In certain embodiments, the data obtained from the mobile device may include one or more of the following: data sensed by one or more sensors of the mobile device, or data gathered by one or more mobile applications of the mobile device, In yet another aspect of the disclosure, a method of printing a document at a print device may include coupling the print device to a proximate mobile device; by a processor of the print device: receive a document to be printed from the mobile device, receive information relating to an identified context from the mobile device, use the information relating to the identified context to customize the received document by identifying and modifying at least one parameter of the received document, and print the customized document. In an embodiment, modifying the at least one parameter may include performing at least one of the following with respect to the at least one parameter removal, addition, or substitution.

DETAILED DESCRIPTION

Figure 1:
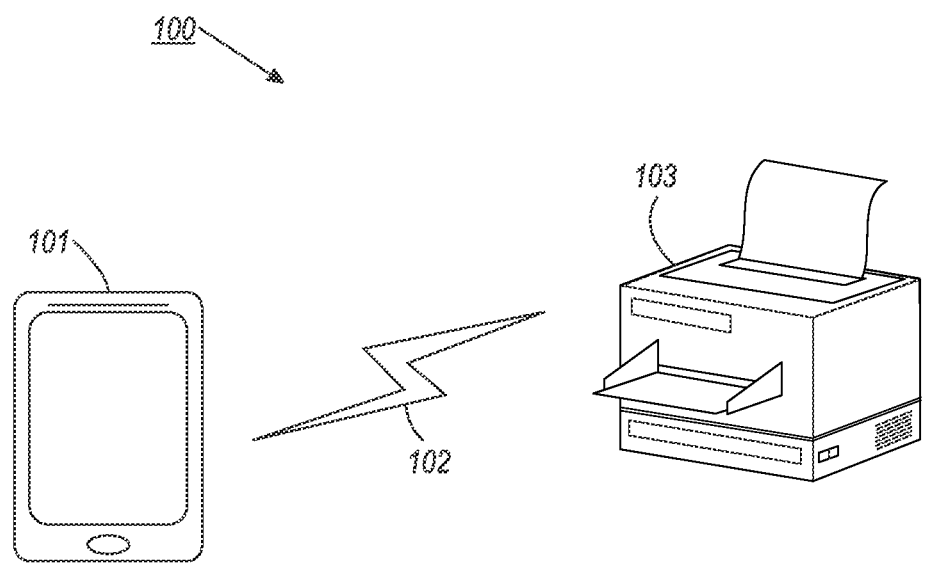
FIG. 1 is a schematic illustration of a system for achieving print functionality according to an embodiment.

This disclosure is not limited to the particular systems, methodologies or protocols described, as these may vary. The terminology used in this description is for the purpose of describing the particular versions or embodiments only, and is not intended to limit the scope.

As used in this document, any word in singular form, along with the singular forms "a," "an" and "the," include the plural reference unless the context clearly dictates otherwise. Unless defined otherwise, all technical and scientific terms used in this document have the same meanings as commonly understood by one of ordinary skill in the art. All publications mentioned in this document are incorporated by reference. Nothing in this document is to be construed as an admission that the embodiments described in this document are not entitled to antedate such disclosure by virtue of prior invention. As used in this document, the term "comprising" means "including, but not limited to."

A "mobile device" or "mobile electronic device" refers to a portable computing device that includes short range wireless communication interface such as an NFC tag, a processor and non-transitory, computer-readable memory. The memory may contain programming instructions in the form of a software application that, when executed by the processor, causes the device to perform one or more print document identifying operations. Examples of suitable portable electronic devices include smartphones, personal digital assistants, cameras, tablet devices, electronic readers, personal computers, media players, satellite navigation devices and the like.

A "print device" refers to a device that includes a print engine for printing a document. The print device may also include a near field communication (NFC) interface used to communicate with one or more other devices, a processor that can process the document and a memory unit for storage of the documents or portions of the document. Any suitable print device can be used including, but not limited to, inkjet and laser print devices and multifunction devices.

The term "document" refers to a writing that provides information, the writing including text and/or images. The term "document" may include a text file, a Web page, a newsgroup posting, a picture, media, hyperlinks, etc. The document may, for example, include several areas consisting of text, and other areas consisting of images or graphics. The text, for example, may include narrative sections of some length, as well as titles and captions.

The term "context" refers to a specific situation and/or an event corresponding to a user at any given point in time. Context may include one or more types of context information. Examples of different types of context information may include, without limitation, geographic location of a user, internet network and/or telephone network; identity of a user; time; intended use of the document (such as business use or personal use); type of document itself; or a combination thereof. A document may be customized to a context by including a set of parameters that are unique to the context. For example, for context including geographic location type of context information based on the presence of a user in a particular region or country, the set of parameters for customization of a document to the location may include the regional language, style, format (such as color, margins, design, font, images, etc.) or other such parameters.

A "sensing module" refers to a set of programming instructions that when executed automatically sense and/or read information (or data), for identification of context information, from mobile device sensors or applications, and/or information contained within the mobile device itself. For example, the sensing module may interact with the location tracking sensors, of the mobile device, such as a global positioning system transmitter, Wi-Fi triangulation, and micro-location sensors (e.g., hotpots, beacons, tags, transmitters) to determine the location of a user. The sensing module may also interface with other mobile applications such as the calendar application, social media applications, profile settings, etc. to gather data for identifying the context information (as discussed below).

FIG. 1 shows an example connection of a print device 103 and a mobile device 101 over a near field communication (NFC) interface 102 in accordance with the principles of the current disclosure. In some embodiments, the NFC interface 102 can be embodied as a circuit or similar electronic component or components that allows for contactless communication between devices that are located very close to one another. As an example, each device may be equipped with an NFC tag that permits NFC communication between the devices. An NFC tag may be simply affixed to the print device 103 as a static tag, or the tag may be integrated into the communications interface of the print device 103 as a dynamic tag that is powered by the print device 103.

Near field communications are defined by a collection of standards for radio frequency communications that may be used when two devices are in close proximity. Protocols for implementation of near field communication may comply with industry standards, such as ISO/IEC 18092 or ISO/IEC 18000-3, published by the International Standards Organization. Typical ranges for near field communications are approximately 10 cm or less, although it may be 20 cm or less, 4 cm or less, or other ranges. Near field communications can support two-way (or peer-to-peer) communications between devices. In a passive mode, an NFC initiator device may output a carrier field that a target device (or transponder) uses to respond by modulating the provided field. In an active mode, the initiator and the target can each generate a carrier field, and the devices communicate by altering the fields. When utilizing two-way communications, two devices may exchange data to perform various functionalities that are enabled as a result of the near field communications.

The print device 103 may be configured to enable near field communication with a variety of NFC enabled devices including NFC enabled mobile devices and NFC tags. The NFC tag may include information to be transmitted to other NFC enabled devices. The functionality performed by the print device may be implemented via execution of a local print device application or some of the functionality may be performed via processing that occurred at a host processor or a server connected via a network or a cloud device.

Near field communications require close proximity (e.g., no more than a few inches, or in some cases no more than one or two feet) to establish a communications link, and hence the operation of establishing a link with another NFC device may be referred to as a "tap." The term "tap" as used herein does not necessarily refer to physical contact between communicating NFC devices, but rather positioning the NFC devices in sufficiently close proximity to establish an NFC communications link. Therefore, a user of an NFC enabled smart phone may tap an NFC tag to send and/or receive data from the tag. Near field communications offers several advantages over other wireless protocols and methods for encoding data to be read by a mobile terminal because of the short range nature of near field communications. Some examples include avoiding cross-talk from other nearby tags, managing access, improving security, and low power requirements. NFC tags may also be configured such that when read by the mobile terminal, cause the mobile terminal to perform certain processing actions, such as launching of applications, navigating to a particular website, or downloading of a particular file.

In some embodiments, the NFC tag may be operable to initiate a direct or indirect network connection between an NFC enabled device (e.g., the mobile device 101) and the print device 103 via a network protocol other than NFC. For example, the specially encoded NFC tag of the print device 103 may respond to a field generated by another NFC enabled device by providing information that identifies network information about the print device 103 (e.g., Bluetooth® address, IP address, MAC address, or the like). In this regard, the print device's NFC tag may transmit a print device identifier for receipt by, for example, the mobile device 101. The mobile device 101 may be configured to identify the print device identifier as being associated with a print device and to launch an application that may begin the process of pairing the mobile device 101 with the print device 103. The NFC interface may also be used to initially authenticate the mobile device and/or the print device.

While the current disclosure relies on NFC to establish the initial connection between a mobile device and a print device, it will be apparent to those skilled in the art that other short-range wireless communication protocols may also be used in accordance with the principles of the current disclosure.

In some embodiments, the communications link may also involve a secondary communications link, such as a Bluetooth® or WiFi link between the mobile device 101 and the print device 103 in addition to the initial NFC link. Upon establishing a higher speed link, the print device 103 may be configured to send/receive data to/from the mobile device 101 to perform various tasks via the higher speed link. The secondary communications link will typically be able to exchange communications over a larger distance than the NFC link. These other communication protocols, once authenticated by the NFC process, may be as secure as the NFC communication process and may operate more quickly when large amounts of data are being exchanged.

In this document, the terms "print application" and "print software" refer to a software application that is configured to cause an electronic device to perform some or all of the functions that are described in this disclosure.

Figure 2:
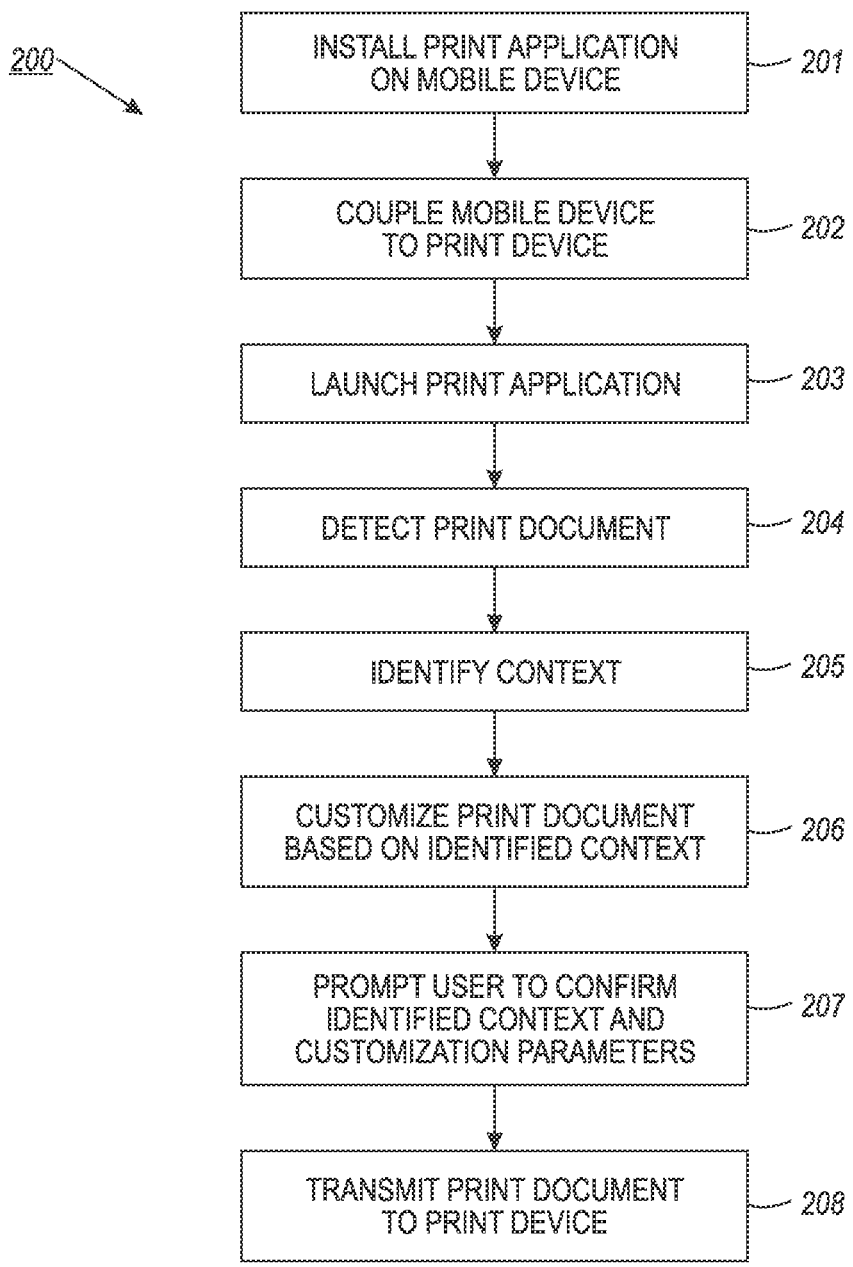
FIG. 2 depicts a flow chart example of a process for printing a customized document using a mobile device and a print device, according to an embodiment.

FIG. 2 depicts a flow chart example of a process for printing a customized document from a mobile device according to an embodiment. To begin with, the user of a mobile device may download and install a print application onto the mobile device in step 201. The user may acquire the application by downloading it from an application store or from a print service provider. In certain embodiments, the print application may be pre-installed on the mobile device. The print application may include virtually any application type which may run on any underlying operating system or platform. The installed print application may register itself with the mobile operating system allowing the application to monitor certain activities on the mobile operating system, and using the functionalities of the operating system. The print application operates to identify and customize a document to be printed on the mobile device as discussed later.

The print application may correspond to a local application which executes on the mobile device. Alternatively, the print application may represent a web application which executes on a remote application server. That is, the print application may include any application functionality which is accessed by the user over a network and experienced locally as application e.g., using a browser running on the mobile device. Techniques for executing such a web application, and related technology, are well known in the art and are therefore not described further in detail herein, except as may be helpful or necessary to understand operations of the system.

In step 202, the user may couple the mobile device to the desired print device. As discussed previously, a user may use any known short range communication protocol, such as NFC, to couple the mobile device to the print device. For example, the user may couple the mobile device to the print device by bringing the NFC enabled mobile device within a communication range (hereinafter referred to as "tap") of the NFC tag attached to and/or incorporated within the print device (discussed previously). Such NFC coupling allows the user to couple the mobile device to the print device without having to exit any applications running on the mobile device. For example, the user may be able to couple the mobile device to the print device while reading a document on the mobile device on a document viewer. In certain embodiments, the device may seek user authentication for the coupling. For example, a user may need to enter an authentication code or password, and/or select a desired print device from a plurality of available print devices in order to authenticate the coupling.

Use of the terms "coupled" and "connected", along with their derivatives, may be used. "Coupled" may be used to indicate that two or more elements are in either direct or indirect (possibly with other intervening elements between them) physical, communicative, or electrical contact with each other, and/or that the two or more elements co-operate or interact with each other. Coupling means establishing a paired communication link whereby the devices recognize each other and transmit information via NFC or a short range communication protocol.

Prior to the start of establishing the NFC connection, the mobile device may be in a "wake on NFC" mode. In this mode, the NFC interface of the mobile device may remain inactive until the NFC interface receives an NFC signal from another NFC interface. At the same time, NFC interface of the print device may be in a host mode. In the host mode, the NFC interface if the print device may periodically emit NFC signals to seek out other nearby NFC interfaces.

The establishment of the NFC connection in step 202 may begin with an initiation handshake. The initiation handshake may start when a user taps the NFC interface of the mobile device to the NFC interface of the print device. As mentioned above, while the NFC interface of the print device may be in a host mode, it may periodically emit a ping message. NFC interface the mobile device may receive the ping message, causing the NFC interface of the mobile device to awake and reply with an acknowledgement message, which may be received by the NFC interface of the print device.

The above process, in some embodiments, may require exchange of authentication or encryption data (e.g., username, password, etc.) to ensure security of the transmission. In addition, the requirement of very close proximity of NFC transmissions serves to further ensure security of the exchange of data. Once the NFC connection has been established, the print device and the mobile device may communicate information between each other via the NFC connection and/or via a secondary communications link such as WiFi as discussed previously.

In step 203, the mobile operating system launches the print application in response to the coupling of the mobile device with the print device. This launching may occur automatically, without requirement for user action, in response to the mobile device detection that it has been coupled to the print device. In other embodiments, the device may automatically prompt the user to confirm whether to launch the print application. In certain embodiments, the mobile application is launched in the background and does not interfere with the already running foreground applications on the mobile device.

The mobile application identifies (step 204) the document to be printed. In some embodiments, the user may identify the document to be printed be entering a selection of the document into a user interface of the electronic device that the application generates. In some other embodiments, the mobile application may identify the document to be printed by detecting a most recent triggering event with respect to a document, and identify the corresponding document as the document to be printed by comparing the time of detection of the triggering event with a threshold time. In some embodiments, the user may identify the document to be printed.

The document to be printed may include a plurality of default context specific parameters, such as one or more of a plurality of formats, styles, configurations, and/or languages. In some embodiments, a document to be printed may include a plurality of parameters specific to more than one context.

The mobile application also operates to automatically identify context in step 205. The identified context may include one or more types of context information. As discussed above, examples of the types of context information may include, without limitation, the geographic location of the user, time of printing, an intended use of the document, user-profile and other such information relating to situations and/or events corresponding to the user. In some embodiments, the mobile application may allow the user to select one or more types of context information to be included in the identified context (and used in the customization of the print document in step 206). In certain other embodiments, the mobile application may identify the types of context information to be included in the identified context based on past user actions (discussed below).

In certain embodiments, the user may provide some or all of the context information to the mobile device.

The print mobile application may utilize the sensing module to receive data or information from various sensors and mobile applications, and determine the context information based on the obtained data. The sensing module may employ any suitable available mechanisms (such as sensors, and mobile applications) for obtaining data for identification of context information. In an embodiment, the mechanisms for obtaining information for identification of context information may depend on, without limitation, the type of data or information (e.g., location, time), type of context information, the mobile device capabilities, the print device capabilities, the type of communication link between the mobile device and the print device, and other such parameters.

For example, in an embodiment, the sensing module may use a location tracking sensor to obtain data relating to the geographic location of a user (context based on location), which may be used for identifying context information relating to a user's geographic location. The sensing module may employ various location sensors of the mobile device such as global positioning system of the mobile device, Wi-Fi based positioning system (Wi-Fi triangulation), or micro-location techniques using tags, beacons, hotspots, transmitters, in order to receive information relating to the geographic location of a user. In certain other embodiments, the sensing module may determine the location of a user by using a network receiver application of the mobile device to identify the address and location of a connected Wi-Fi or a mobile communication network. Alternatively and/or additionally, the sensing module may determine the location of a user by accessing calendar entries stored in a calendar application (and/or travel organizer applications) of the mobile device, and correlating the calendar entries to the time of printing. In an embodiment, location of the user may be determined using ceiling images from a camera associated with a user's mobile device and/or down facing images of a multifunction device. The above embodiments are provided by way of example only and the sensing module may use other location identification technologies known in the art. Such a location determination may be set to any granularity level of location region, including by country, province, state, county, city, municipality, neighborhood, a customized region (e.g., configured by the user interacting with a user interface element), or any other location region.

In another embodiment, the sensing module may obtain data for identifying context information regarding the intended use of the document to be printed, by interfacing with the mobile device applications and sensors. For example, the sensing module may data relating to the format of the document to be printed by identifying the mobile application used to store, read, open, and/or otherwise process the document. The sensing module may further interface with the identified mobile application to parse the contents, identify the source of the document, and/or receive other similar data in order to determine the intended use of the document. Additionally and/or optionally, the mobile device may also use the location sensors of the mobile device to identify the geographic location of printing (as discussed above) and use the location information alone or in combination with other data to determine context related to an intended use of the document. In certain other embodiments, the sensing module may also use the calendar application of the mobile device and parse the calendar entries to data to determine context related to an intended use of the document. The sensing module may determine the context information relating to the intended use of the document by processing the above data. For example, the sensing module may determine that the document to be printed is a business card (based on forma and content), the location and time of printing is a trade fair in Italy, and use the above information to determine that the intended use of the document is distribution of the business cards to trade fair participants. Examples of intended use of a document may include, without limitation, business cards to be distributed to contacts, tickets to gain entry to an event and/or place, product labels for displaying product information, name tags, and other similar uses of print documents.

In another embodiment, the sensing module may obtain data for identifying context information for user-profile by interfacing with one or more mobile applications that may include such information. Examples of such mobile applications may include, without limitation, social media applications such as Facebook, Twitter, and WhatsApp; cloud sourcing applications such as Yelp and Pinterest; the operating server of the mobile device for accessing information provided by the user (profile settings, language selections, etc.); communication applications (email, messaging, etc.), and other similar means. The sensing module may process the above to data to determine context information relating to the user's profile such as determine, without limitation, the user's primary language of communication (based on language settings, etc.), user's primary region of residence (based on social media information, etc.), user's occupation, and other such information.

The above types of context information and mechanisms for identification of context information are provided by way of example only and it will be understood to those skilled in the art that other types of context information and mechanisms for identification of the context information are within the scope of this disclosure.

In response to identification of the context in step 205, the mobile application may customize (step 206) the document to be printed by incorporating and/or modifying one or more parameters corresponding to the identified context. Examples of parameters may include, without limitation, language, style of some or all of data elements, format (such as location of data elements on the document, margins, color, font size and type, and other similar formatting elements), and context specific images. The incorporation of one or more parameters corresponding to the identified context may include, without limitation, substitution of parameters (or data), application of alternate layouts, formats, and/or styles, removal of parameters (or data), addition of parameters (or data), application of localizations, other known variable printing techniques, or a combination thereof.

For instance, the rules for customization of the print document based on context may include, without limitation:

(a) Incorporation of context specific parameters for the particular region in which the mobile device is located. For instance, if the user is using the mobile device in the United States, there is a reasonable likelihood that the user desires to print a document in English and corresponding acceptable formats and/or styles. If, at another time, the user is using the mobile device in China, there is a reasonable likelihood that the user desires to print the document in Chinese and corresponding acceptable formats and/or styles. The mobile application may thus automatically customize the document based on location by incorporating parameters specific to the detected region. Changing of the document language and/or format in this manner may save the user from having to manually change the language and/or format whenever the user changes localities.

(b) Incorporation of context specific parameters for the particular intended use of the document to be printed. For instance, if the system infers based on identified context that the user wishes to print business cards, the mobile application may automatically incorporate the user's personal information in a business card format.

(c) Incorporation of context specific parameters for the particular user-profile of the user of a mobile device. For instance, the system may customize the document based on the identified primary language and/or the occupation of a user.

(d) In certain other embodiments, the parameters for customization of the print document may correspond to more than one type of context information. For instance, in the above examples, printing business cards (intended use) when the mobile device of a user from United States is determined to be located in China (or another location), the mobile application may format the business cards in the local Chinese dialect (or other local native language of the identified location) using styles and formats for business cards prevalent in the particular Chinese region. Similarly, if the mobile application determines that a user sells products in France based on the user-profile, and the intended use of the document is product labels to be affixed on products, the mobile application may automatically customize the product labels by including parameters specific to the identified context information, such as language, color, and layout.

(e) In certain embodiments, the mobile application may prompt the user to specify the parameters for a given context. For example, if the user is using the mobile device in Belgium, the mobile application may prompt the user to identify the desired language from the prevalent languages in Belgium (Dutch, French, German or Flemish). The mobile application may customize the prompt for the language selection by retrieving information about the identified geographic location of the user from internal and/or external sources. In an embodiment, the mobile application may store the user instructions, and user the stored instructions to automatically incorporate the parameters at a later time.

The mobile application may determine one or more parameters for the identified context (including one or more types of context information) by querying a database on the mobile application itself or by querying one or more external databases. For example, the mobile application may send the current location of the mobile application to a network (e.g., internet) language service and receive from the language service one or more languages for the current location of the mobile application. Alternatively and/or additionally, the mobile application may store a database containing language information for locations around the world. For example, the mobile application may store a database identifying the primary, most popular, or official languages for each country around the world. If the current location of the mobile application corresponds to a particular country, the languages for the particular country can then be retrieved from the database. Similarly, the mobile application may determine other context specific parameters.

In certain embodiments, the mobile application may optionally submit the document for customization to an external service along with the identified context. The document may be sent to the customization service, and then be transmitted back to the mobile device for delivery to the print devices or it may be delivered directly to the print device. Alternatively, the customization may happen internally within the mobile device.

In certain embodiments, the mobile application may also take the printer capabilities into account for context specific customization of the print document by selecting context specific parameters such that the coupled print device is capable of printing the customized document. This may be performed in a variety of ways. For example, in some embodiments, the application may derive the print device profile and information from an NFC tag attached to the print device where the print device model, data related to the capabilities of the print device (e.g. color versus monochrome, whether it supports duplex etc.), or any combination thereof is encoded in the NFC tag. In certain embodiments, the application may derive the print device information over a local and/or remote network by connecting directly to the print device. The network may represent, for example, the Internet or other wide area public or private network. The network may represent, in further examples, a corporate or other intranet, and/or a smaller-scale, local or personal network, any of which may be implemented using standard network technology. In certain other embodiments, the print device information may be stored in a look up service external to the print device and the print application may query the look up service.

In some embodiments, the print application may infer print device capabilities from model information. Alternatively, the print application may consult an external directory to receive information regarding print device capabilities based on the print device model information.

In step 207, the mobile application may prompt the user to confirm the identified context information and corresponding customization parameters. A user may be allowed to accept, reject and/or substitute some or all of the identified context information as well as some or all of the customization parameters. For example, if the mobile application determines that a user is currently in China and the corresponding customization parameters relate to a first Chinese dialect, the user may instruct the mobile application to ignore the location or the user may instruct the mobile application to use the customization parameters corresponding to a second Chinese dialect. The user may be prompted to confirm the identified context and corresponding customization parameters before and/or after the actual customization of the document is performed.

In certain embodiments, the mobile application may also generate context identification and customization rules by learning from previous user instructions and preferences, using methods and techniques known in the art. Additionally, the mobile application may continuously update the rules and user preferences.

In step 208, the mobile application may transmit the customized document to the print device directly or indirectly through an intermediary (e.g., server, computer, or the like) that is coupled (e.g., through one or more wired or wireless connections) to the print device, using the NFC communication interface and/or the secondary communications link. For example, these methods can be used to connect indirectly from mobile device to print device, e.g. mediated through an on-premise cloud server, or through an abstraction representing one or more print devices within an organization's printing service. The delivery of the document may use any appropriate protocol (e.g., LPR, RAW, IPP, WS-Print, etc.) and connection method including, but not limited to, storing as a file on a file system remote from the mobile device; and transmission as an email attachment.

Those ordinarily skilled in the art will understand that there are many other ways in which the document could be transmitted to the print device and that the foregoing merely lists a limited number of examples, and that the embodiments herein are not limited to these examples.

The document to be printed may be sent in a commonly used page description language (PDL), such as the PostScript Language defined by Adobe Systems or the Print device Control Language (PCL) defined by Hewlett-Packard; alternatively it may be provided in a static page representation such as the Portable Document Format (PDF) defined by Adobe Systems, or the XML Paper Specification (XPS) defined by Microsoft; in some embodiments it may also be provided in a native office document format, such as a Microsoft Word, Microsoft PowerPoint or Open Office document. Those ordinarily skilled in the art would understand that there is practically an unlimited number of file formats currently in use by different organizations and more are being created. The embodiments herein are not limited to any specific file format type and work with all existing file formats, and will work with formats that are developed in the future.

In certain embodiments, the print application may also transmit a user defined job ticket to the print device. The job ticket may contain instructions as to how the document within the print job is to be handled by the print device. In certain embodiments, the job ticket may also be customized based on context specific information. The job ticket may, for example, specify that one or multiple copies of one document are to be printed based on the identified location. For example, the mobile application may instruct the print device to print 100 copies of a document identified by the mobile application as a user's resume and based on the user's location at a job fair with about 100 participants. The mobile application may determine the location using above discussed micro-location techniques and/or user's calendar entries and the querying the internet for more information on the context, i.e., the job fair event.

Similarly, the job ticket may direct that the document within the print job be finished in some manner (bound, stapled, folded, etc.) based on the identified context. The print application may formulate the job ticket in a format compatible to the print device based on user defined criteria. Those ordinarily skilled in the art will understand that there are many ways known in the art in which the mobile application may formulate the job ticket without deviating from the principles of the current disclosure. Some examples of the formats may include Xerox job ticket format, internet printing protocol (IPP) job ticket format, and other similar formats. The print application may formulate the job ticket within the mobile device, or it may use an external network service. The job ticket may be transmitted to the print device as part of the print job (with the document), or it may be transmitted separately using job delivery protocols known in the art.

In certain embodiments, the mobile application may transmit the identified context information (from step 205) and the print document to the print device. The print device may then customize the print document based on the identified context (step 206), prompt user to confirm identified context and customization parameters (step 207), as discussed above. The user may be prompted to confirm the identified context and corresponding customization parameters before and/or after the actual customization of the document is performed.

Figure 3:
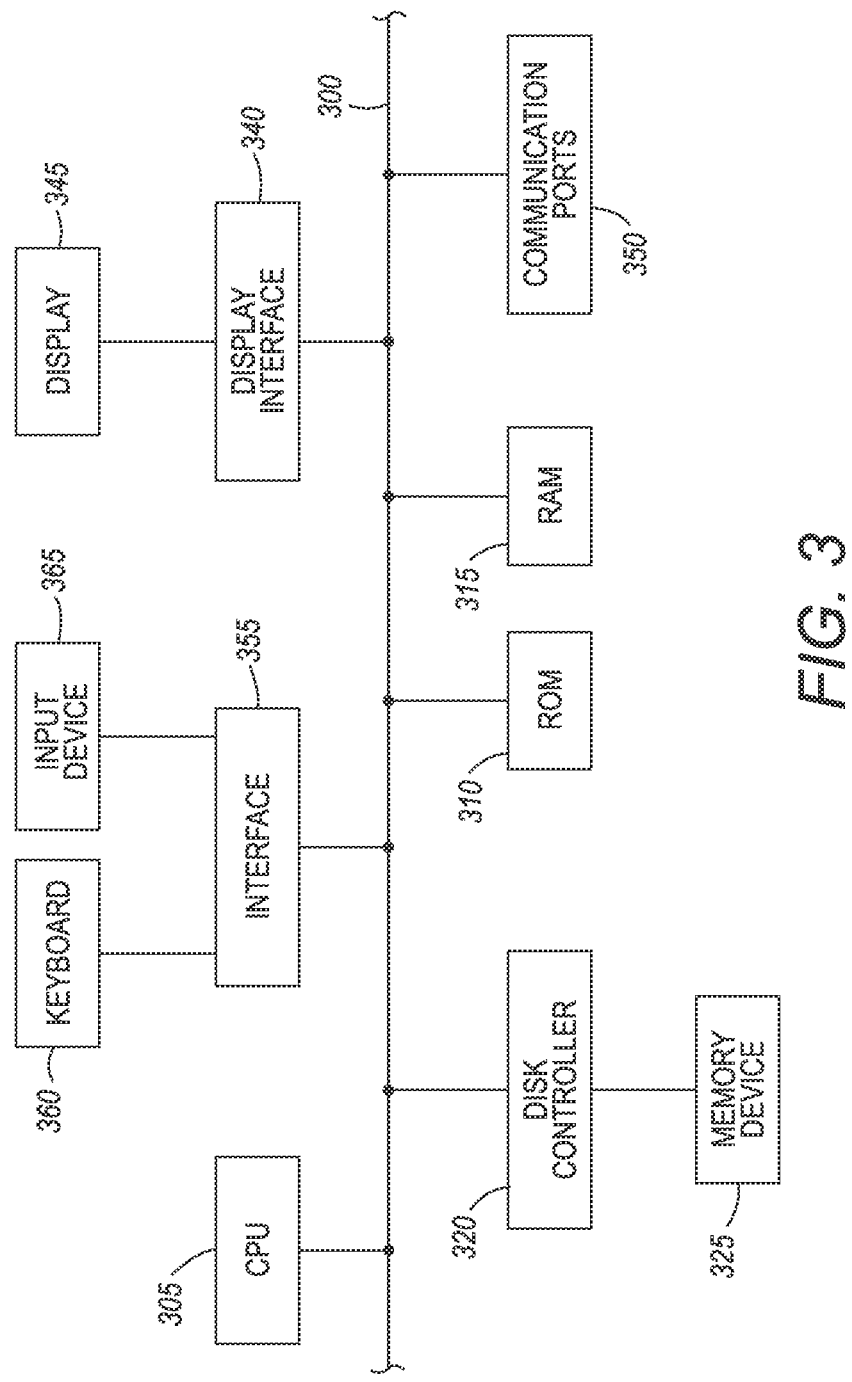
FIG. 3 depicts various embodiments of a mobile device for using the systems and processes described in this document.

The print method and process as described above may be performed and implemented by an operator of a mobile electronic device and/or a print device having a processor and a communications interface (including NFC). FIG. 3 depicts an example of internal hardware that may be used to contain or implement the various computer processes and systems as discussed above. For example, the mobile electronic device discussed above may include hardware such as that illustrated in FIG. 3. An electrical bus 300 serves as an information highway interconnecting the other illustrated components of the hardware. CPU 305 is a central processing unit of the system, performing calculations and logic operations required to execute a program. CPU 305, alone or in conjunction with one or more of the other elements, is a processing device, computing device or processor as such terms are used within this disclosure. A CPU or "processor" is a component of an electronic device that executes programming instructions. The term "processor" may refer to either a single processor or to multiple processors that together implement various steps of a process. Unless the context specifically states that a single processor is required or that multiple processors are required, the term "processor" includes both the singular and plural embodiments. Read only memory (ROM) 310 and random access memory (RAM) 315 constitute examples of memory devices. The term "memory device" and similar terms include single device embodiments, multiple devices that together store programming or data, or individual sectors of such devices.

A controller 320 interfaces with one or more optional memory devices 325 that service as date storage facilities to the system bus 300. These memory devices 325 may include, for example, an external or internal disk drive, a hard drive, flash memory, a USB drive or another type of device that serves as a data storage facility. As indicated previously, these various drives and controllers are optional devices. Additionally, the memory devices 325 may be configured to include individual files for storing any software modules or instructions, auxiliary data, incident data, common files for storing groups of contingency tables and/or regression models, or one or more databases for storing the information as discussed above.

Program instructions, software or interactive modules for performing any of the functional steps associated with the processes as described above may be stored in the ROM 310 and/or the RAM 315. Optionally, the program instructions may be stored on a non-transitory, computer readable medium such as a compact disk, a digital disk, flash memory, a memory card, a USB drive, an optical disc storage medium, and/or other recording medium.

An optional display interface 340 may permit information from the bus 300 to be displayed on the display 345 in audio, visual, graphic or alphanumeric format. Communication with external devices may occur using various communication ports 350. A communication port 350 may be attached to a communications network, such as the Internet, a local area network or a cellular telephone data network.

The hardware may also include an interface 355 which allows for receipt of data from input devices such as an imaging sensor 360 of a scanner or other input device 365 such as a keyboard, a mouse, a joystick, a touchscreen, a remote control, a pointing device, a video input device and/or an audio input device.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A method of printing a document from a mobile device comprising:
    coupling the mobile device to a proximate print device; and
    by a processor of the mobile device executing a print software application that causes the processor to:
        identify a document to be printed,
        obtain information relating to at least one of the following: a user of the mobile device or the identified document,
        use the information to automatically infer a context at a time that is concurrent with identifying the document, wherein the context is indicative of potential formats of the identified document desirable by the user of the mobile device upon printing of the identified document,
        use the context to customize the identified document by identifying and modifying at least one parameter of the identified document to produce a printed document, and
        transmit the customized document to the print device for printing by the print device to produce the printed document.

2. The method of claim 1, wherein coupling the mobile device to the print device comprises establishing a near field communications link upon detection that the mobile device and the print device are within a communication range of each other.

3. The method of claim 1, wherein the at least one parameter associated with the identified context comprises at least one of: language, style, color, font size, font type, color, layout, design, or images.

4. The method of claim 1, wherein the print software application is automatically launched in response to the coupling of the mobile device to the print device.

5. The method of claim 1, further comprising, by the processor, prompting a user to confirm the inferred context and the at least one parameter.

6. The method of claim 1, wherein modifying the at least one parameter comprises performing at least one of the following with respect to the at least one parameter removal, addition, or substitution.

7. The method of claim 1, wherein using the information to infer the context comprises performing at least one of the following:
    using a geographical location of the user of the mobile device to infer the context,
    using an intended use of the document to infer the context,
    using a user-profile associated with the user of the mobile device to infer the context,
    using a type of the document to infer the context, or
    using a time of printing the document to infer the context.

8. The method of claim 7, wherein using a geographical location of the user of the mobile device to infer the context comprises at least one of the following:
    using one or more location tracking sensors of the mobile device to sense the location of the user of the mobile device, or
    receiving data from a calendar application of the mobile device and using the data to identify the location of the user of the mobile device.

9. The method of claim 8, wherein using the one or more location tracking sensors to sense the location of the user of the mobile device comprises at least one of the following:

using data captured by a positional sensor of the mobile device to detect the location of the user of the mobile device, using an identifier of a network to which the mobile device is connected, or using a micro-location technique of the mobile device.

10. The method of claim 7, wherein using the intended use of the document to infer the context comprises at least one of the following:

using one or more document processing applications of the mobile device to determine a format of the document, using one or more document processing applications of the mobile device to determine contents of the document, using location tracking sensors or applications of the mobile device to determine a location of printing, using one or more document processing applications of the mobile device to determine a source of the document, using a clock application of the mobile device to determine a time of printing, or parsing entries in a calendar application of the mobile device.

11. The method of claim 7, wherein using the information to infer the context further comprises using previous user selection or preferences to identify types of context information.

12. The method of claim 1, further comprising creating a customized job ticket using the inferred context, and transmitting the customized job ticket to the print device.

13. The method of claim 12, wherein the customized job ticket comprises information relating to the number of copies of the customized document to be printed by the print device based on the inferred context.

14. A non-transitory computer-readable medium comprising a plurality of instructions, the plurality of instructions including instructions which, when executed by a processor, identify a document to be printed on a mobile device, obtain information relating to at least one of the following: a user of the mobile device or the identified document, use the information to automatically infer a context at a time that is concurrent with identifying the document, wherein the context is indicative of potential formats of the identified document desirable by the user of the mobile device upon printing of the identified document, use the context to customize the identified document by identifying and modifying at least one parameter of the identified document to produce a printed document, and transmit the customized document to a print device for printing by the print device to produce a printed document.

15. The non-transitory computer-readable medium of claim 14, wherein modifying the at least one parameter comprises performing at least one of the following with respect to the at least one parameter removal, addition, or substitution.

16. The non-transitory computer-readable medium of claim 14, wherein the plurality of instructions for using the information to infer the context comprise instructions for performing at least one of the following:

using a geographical location of the user of the mobile device to infer the context, using an intended use of the document to infer the context, using a user-profile associated with the user of the mobile device to infer the context, using a type of the document to infer the context, or using a time of printing the document to infer the context.

17. The non-transitory computer-readable medium of claim 16, wherein using the geographical location of the user to infer the context comprises at least one of the following:

using one or more location tracking sensors of the mobile device to sense the location of the user, or receiving data from a calendar application of the mobile device and using the data to identify the location of the user.

18. The non-transitory computer-readable medium of claim 17, wherein using the one or more location tracking sensors to sense the location of the user comprises at least one of the following:

using data captured by a positional sensor of the mobile device to detect the location of the user, using an identifier of a network to which the mobile device is connected, or using a micro-location technique of the mobile device.

19. The non-transitory computer-readable medium of claim 16, wherein using the intended use of the document to infer the context comprises at least one of the following:

using one or more document processing applications of the mobile device to determine a format of the document, using one or more document processing applications of the mobile device to determine contents of the document, using location tracking sensors or applications of the mobile device to determine a location of printing, using one or more document processing applications of the mobile device to determine a source of the document, using a clock application of the mobile device to determine a time of printing, or parsing entries in a calendar application of the mobile device.

20. The method of claim 16, wherein the plurality of instructions for using the information to infer the context further comprise instructions for using previous user selection or preferences to identify types of context information.

21. A method of printing a document at a print device comprising:

coupling the print device to a proximate mobile device; and by a processor of the print device:

receiving a document to be printed from the mobile device, receiving information relating to an inferred context from the mobile device, wherein the inferred context is indicative of potential formats of the identified document desirable by a user of the mobile device upon printing of the identified document, using the information relating to the identified context to customize the received document by identifying and modifying at least one parameter of the received document to produce a printed document, and printing the customized document to produce a printed document.

22. The method of claim 21, wherein modifying the at least one parameter comprises performing at least one of the following with respect to the at least one parameter removal, addition, or substitution.

23. A system for printing a document from a mobile device comprising:

a non-transitory, computer readable memory;

one or more processors; and a computer-readable medium containing programming instructions that, when executed by the one or more processors, cause the system to:
couple the mobile device to a print device,
execute a print software application on the mobile device to:
identify a document to be printed,
obtain information relating to at least one of the following: a user of the mobile device or the identified document,
use the information to automatically infer a context at a time that is concurrent with identifying the document, wherein the context is indicative of potential formats of the identified document desirable by the user of the mobile device upon printing of the identified document,
use the context to customize the identified document by identifying and modifying at least one parameter of the identified document to produce a printed document, and
transmit the customized document to the print device for printing by the print device to produce a printed document.

24. The system of claim 23, wherein the programming instructions that when executed cause the system to couple the mobile device to the print device comprise programming instructions that cause the system to establish a near field communications link upon detection that the mobile device and the print device are within a communication range of each other.

25. The system of claim 23, wherein the at least one parameter associated with the identified context comprises at least one of: language, style, color, font size, font type, color, layout, design, or images.

26. The system of claim 23, wherein modifying the at least one parameter comprises performing at least one of the following with respect to the at least one parameter removal, addition, or substitution.

27. The system of claim 23, wherein the programming instructions that when executed cause the system to use the information to infer the context comprise programming instructions that cause the system to perform at least one of the following:
using a geographical location of the user of the mobile device to infer the context,
using an intended use of the document to infer the context,
using a user-profile associated with the user of the mobile device to infer the context,
using a type of the document to infer the context, or
using a time of printing the document to infer the context.

28. The system of claim 27, wherein using the geographical location of the user of the mobile device to infer the context comprises at least one of the following:
using one or more location tracking sensors of the mobile device to sense the location of the user of the mobile device, or
receiving data from a calendar application of the mobile device and using the data to identify the location of the user of the mobile device.

29. The system of claim 28, wherein using the one or more location tracking sensors to sense the location of the mobile device comprises at least one of the following:
using data captured by a positional sensor of the mobile device to detect the location of the user of the mobile device,
using an identifier of a network to which the mobile device is connected, or
using a micro-location technique of the mobile device.

30. The system of claim 27, wherein using the intended use of the document to infer the context comprises at least one of the following:
using one or more document processing applications of the mobile device to determine a format of the document,
using one or more document processing applications of the mobile device to determine contents of the document,
using location tracking sensors or applications of the mobile device to determine a location of printing,
using one or more document processing applications of the mobile device to determine a source of the document,
using a clock application of the mobile device to determine a time of printing, or
parsing entries in a calendar application of the mobile device.

* * * * *